United States Patent [19]

Brasnett

[11] 4,092,669
[45] May 30, 1978

[54] APPARATUS FOR MEASURING SPATIAL DATA FROM RECORDED IMAGES

[75] Inventor: Keith Ashley Brasnett, Bristol, England

[73] Assignee: Rolls-Royce (1971) Limited, Great Britain

[21] Appl. No.: 687,216

[22] Filed: May 17, 1976

[30] Foreign Application Priority Data
May 31, 1975 United Kingdom ............... 23735/75
July 15, 1975 United Kingdom ............... 29575/75

[51] Int. Cl.² .............................................. H04N 7/18
[52] U.S. Cl. ................................... 358/107; 356/156; 356/167; 356/170
[58] Field of Search ................. 358/107, 97, 127, 139, 358/214, 215; 356/156, 167, 170

[56] References Cited
U.S. PATENT DOCUMENTS

| | | | |
|---|---|---|---|
| 3,028,544 | 4/1962 | Stone | 356/156 |
| 3,678,192 | 7/1972 | Akuta | 358/107 |
| 3,931,462 | 1/1976 | Exton | 358/107 |

OTHER PUBLICATIONS

NASA Tech. Paper - Mar., 1973 - Videomicrodensitometers.
International Imaging Systems - 5-9-75 Video Microdensitometer-Systems.

Primary Examiner—Benedict V. Safourek
Assistant Examiner—Edward L. Coles
Attorney, Agent, or Firm—Stevens, Davis, Miller & Mosher

[57] ABSTRACT

Apparatus for taking spatial measurements from recorded radiographic or photographic films includes a co-ordinate measuring framework on which are statically mounted a video camera and light source, and on which can be placed the film. The camera scans a small area of the film which is illuminated by the light source and the film is movable beneath the camera to enable any part thereof to be scanned. The information produced by the camera is passed to a video-microdensitometer which displays on its output screen an image of the area of the film being scanned. Measurement is achieved by lining features on the displayed image against a datum line by movement of the film below the camera in the framework and noting the co-ordinates of the new positions of the film on the frameworks.

5 Claims, 6 Drawing Figures

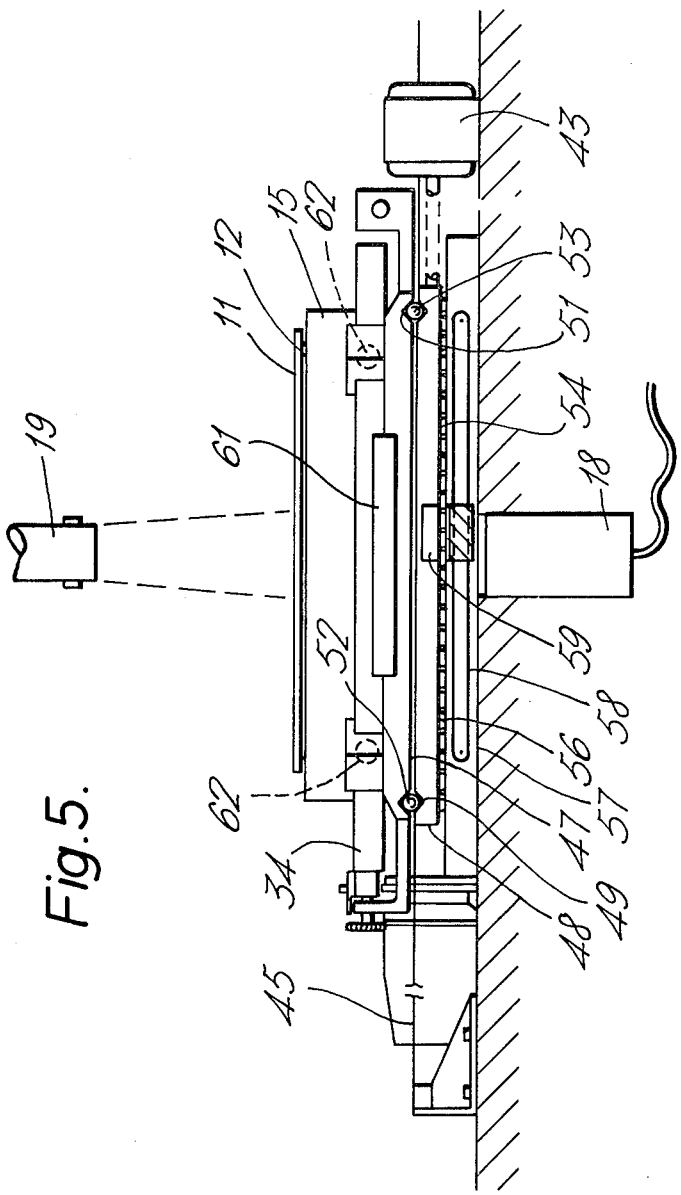

APPARATUS FOR MEASURING SPATIAL DATA FROM RECORDED IMAGES

The present invention relates to improvements in apparatus for measuring spatial data from recorded images and has particular reference to determining spatial relationships between images recorded on radiographic films. It is impossible to rely on the judgement of the human eye as to where the true edge positin of a radiographic image lies because of the subjective judgement called for by the inherent unsharpness of the edges of radiographic images. Thus it is desirable to substitute a more accurate form of measurement.

It is known in the art of X-ray crystallography to produce radiographs by directing X-rays at matter to yield diffraction patterns characteristic of the inverse lattice structure of the matter being examined. Further information about these diffraction patterns is then obtained by using a photomicrodensitometer to plot the intensity distribution across the diffraction pattern.

This has led to the availability of a range of photomicro densitometers which are capable of examining spatial intensity distributions across images recorded on radiographic film. However, such photomicrodensitometers are not readily amenable to examining spatial intensity distributions across larger more involved recorded images such for example as may be produced by taking radiographs of jet engines. Present microdensitometers are not sufficiently fast in use to quickly analyse the large quantity of information in such radiographs, and furthermore constitute expensive items of equipment not readily available at the present time in sufficiently large sizes for examining radiographs of jet engines.

An alternative type of densitometer also exists often referred to as a video microdensitometer and this comprises a video camera which scans and reproduces the recorded image on an output screen of a cathode ray tube and incorporates a device which will plot, alongside the image on the output screen, the intensity distribution along any desired line through the image.

By examining this intensity distribution plot an estimate may be made of the true edge position of the object that initially gave rise to the recorded image. This is done by calibration of the output screen and by direct measurement therefrom. This system, which is very versatile does however, suffer certain disadvantages. The video camera can be positioned to take in as large a field of view as is required and thus large radiographs can be displayed on the output screen of the video microdensitometer. However, the camera tubes available are of relatively small size and consequently if large radiographic images are focussed onto the image plane of the camera tube there is a reduction in size and consequent loss of detail on the output screen as compared with that available on the radiograph. Furthermore the accuracy of the calibration of the screen needs to be considered and allowances made for any aberrations in the system, non-uniformity of the imaging system and possible degradation of the equipment with age. Measurement of detail from the screen is ordinarily done with a so called video micrometer which comprise basically a pair of horizontal caliper lines on the output screen whose position and separation are adjustable to allow them to be positioned coincident with the features to be measured. The separation of the two horizontal caliper lines is then displayed by the video micrometer as a function of the electronic raster. This has the disadvantage that the calibration of the raster tends to drift and the system needs recalibrating perhaps twice during each working day. The above mentioned disadvantages reduce the certainty available for measurements made as described. The present invention proposes an alternative way of making use of the advantages of video microdensitometers.

According to the present invention apparatus capable of taking spatial measurements of the relative positions of features of a recorded image comprises a co-ordinate measuring framework, a video camera disposed to scan a selectable area of the recorded image, wherein the video camera and recorded image are mounted for relative movement therebetween on the co-ordinate measuring framework, there being provided means for passing output information from the video camera to a video-microdensitometer for displaying an amplified image of the selected area of said recorded image on an output screen of the video-microdensitometer together with a plot representative of the optical density variation along a selected line through said amplified image, said video microdensitometer incorporating at least one datum mark against which the amplified image and corresponding portions of the said plot may be aligned by relative movement of the recorded image and video camera within the co-ordinate measuring framework whereby the relative spatial disposition of parts of the recorded image are determinable from said relative movements by means of the co-ordinate measuring framework.

This has the advantage that measurements can always be taken at the same point on the output screen thus avoiding any of the non-linearities or other inaccuracies associated with the video microdensitometer imaging system and furthermore, by scanning only a relatively small area of the recorded image at any one time, inaccuracies in the video camera optical system are minimized and it is possible to supply an amplified image of the recorded image on the output screen thus optimising the image resolution in the camera optical system. A yet further advantage derives from the arrangement inasmuch as only the small area of the radiographic image requies to be illuminated at any one time and to achieve illumination over the whole of the recorded image, the illuminating light source is preferably optically aligned with the camera at all times so that any relative movements between the camera and the recorded image produce corresponding relative movements between the light source and the recorded image.

Also according to the present invention a method of taking spatial movements of the relative positions of features of an image recorded on film comprises the steps of:

mounting the recorded image on a co-ordinate measuring framework, mounting a video camera on the framework, viewing a selected area of the recorded image with the video camera to provide an output image which is fed to a video-microdensitometer, displaying said output image on an output screen of the video-microdensitometer together with a plot representative of the optical density variation along a selected line through the output image, said video-microdensitometer incorporating at least one datum mark against which desired features of the displayed image and the correponding portions of said plot may be aligned, causing relative movement between the recorded image and the video camera within the co-ordinate measuring framework thereby producing a corresponding movement of the displayed image on said screen to produce said alignment, whereby the relative spatial dispostions of the desired features of the recorded image are determinable from the relative movements of the recorded image and the video camera as shown by co-ordinate readings from the framework.

Also according to the present invention a co-ordinate measuring framework comprises a pair of co-ordinate axes, means for supporting a recorded image on a first table movable relative to one co-ordinate axis said first table being supported on a second table movable on a support relative to the other co-ordinate axis and illuminating means disposed on the support beneath both tables and capable of producing a uniformly illuminated area on the recorded image and wherein the tables are adapted to allow the transmission of light therethrough and movable so that any desired portion of the recorded image can be illuminated and whereby the extent of said movements may be determined from respective measuring means associated with each co-ordinate axis.

An embodiment of the invention will now be described by way of example only and with reference to the accompanying drawing in which:

FIG. 5 is a section of the framework of FIG. 4 taken on the line V—V.

Figure 1:
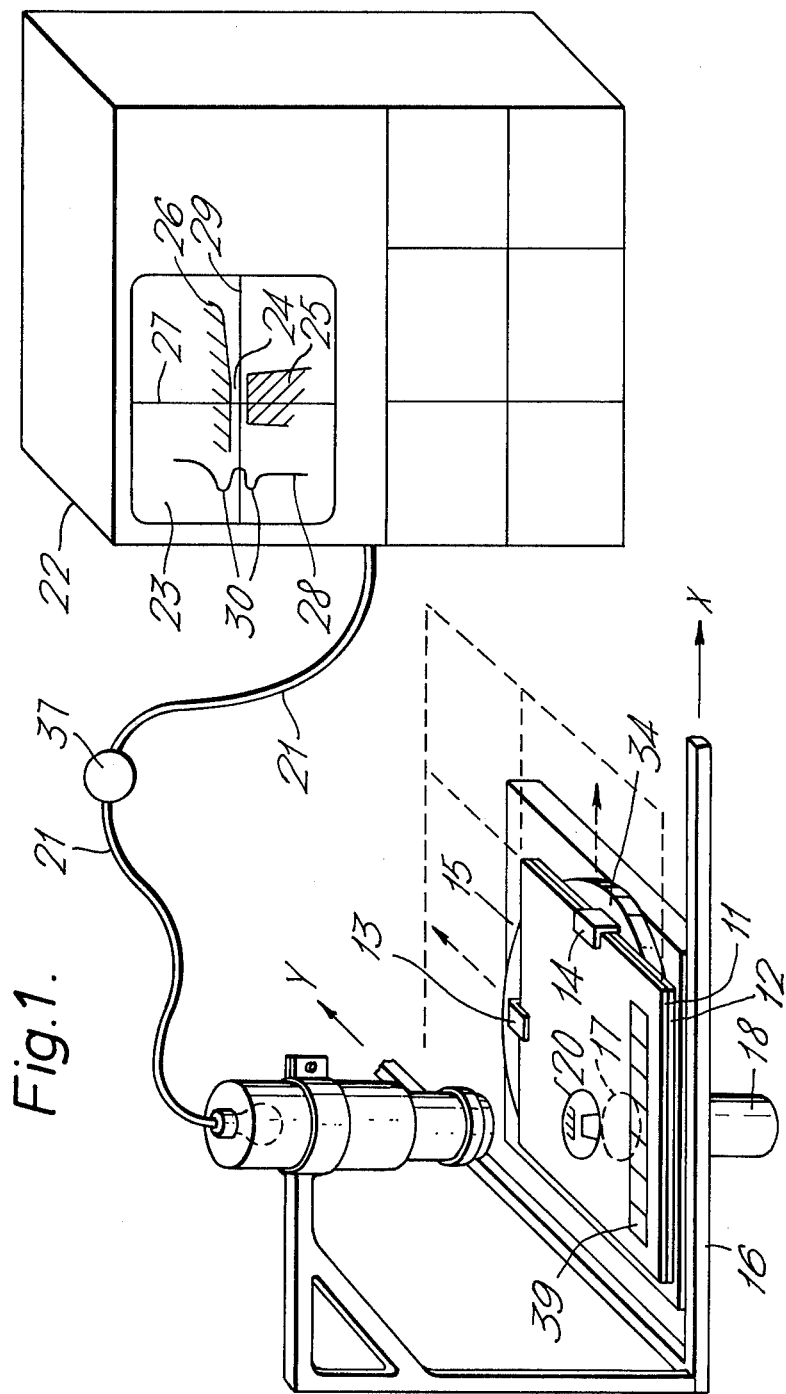
FIG. 1 is a schematic perspective view of the apparatus.

Referring now to FIG. 1 there is shown a radiographic image 10 recorded on radiographic film which is sandwiched between the two layers of plate glass 11,12 and which is clamped at 13,14 to a supporting structure 15 (FIG. 5) disposed within and movable relative to a co-ordinate measuring framework 16. In the centre of the supporting structure is an aperture 17 through which a light source 18 is directed. The light source 18 is an illuminating system which, in this instance, uses two spaced apart diffusing screens and an unfocussed light source to achieve a uniform illumination across the aperture 17.

The aperture 17 in the supporting structure is so positioned and arranged that the entire radiographic film may be moved within the co-ordinate measuring framework across the aperture and thus it is possible to illuminate any desired area 20 of the radiographic film. The aperture 17 is continuously viewed by a video camera 19 whose output is fed via the cable 21 to the videomicrodensitometer 22. The video camera and videomicrodensitometer used in our apparatus is a 720 line non-interlaced vidicon system manufactured by METALS RESEARCH. The video microdensitometer has 896 picture points on each line of its output screen 23. The scanned area of the radiographic film is within a circle of two inches in diameter and the net amplification of the overall system is chosen to provide a picture point resolution equivalent to 0.025 mm on the radiographic image.

The radiographic film is moved on its supporting structure within the co-ordinate measuring framework until the desired feature to be observed appears on the output screen 23 of the video microdensitometer.

In this instance the tip clearance 24 between a compressor blade 25 and its associated radially outer shroud 26 is shown. This clearance together with other clearances can also be seen in more detail by referring to FIGS. 2 and 3. It is known that the part of the tip clearance it is desired to measure should always be substantially constant along the length of the blade tip, and thus it is sufficient to align by eye the clearance 24 astride the vertical line 27 on the output screen. It is along this line that the video microdensitometer, analyses the strength of the electrical signals that go to produce the picture points. These strengths then appear on the output screen to the left of the picture as a plot 28 representative of the intensity distribution along the corresponding line of the radiographic image. It has been found that for looking at radiographs of jet engines it is convenient to take the fifty percent intensity level of the intensity plot as representing a repeatable edge position on the radiographic image. Accordingly there is a horizontal datum line 29 on the output screen against which the 50% level on the flanks of the two intensity peaks 30 can be aligned. In this way the radiographic film is moved within the co-ordinate measuring framework until the first 50% level lies on the horizontal datum and a first co-ordinate reading is taken on the co-ordinate measuring framework. The radiographic film is then moved until the second 50% level lies on the horizontal datum and a second co-ordinate reading is taken. The two co-ordinate readings are then subtracted to yield the spatial separation of the selected edge positions of the blade tip and the radially outer shroud.

It is convenient to align the radiograph with respect to the co-ordinate framework so that movement of the support structure in say the X - direction within the framework is used to align the radial clearance with the vertical line on the output screen and movement of the support structure in the Y - direction is used to measure the spatial extent of the clearance.

Figure 2:
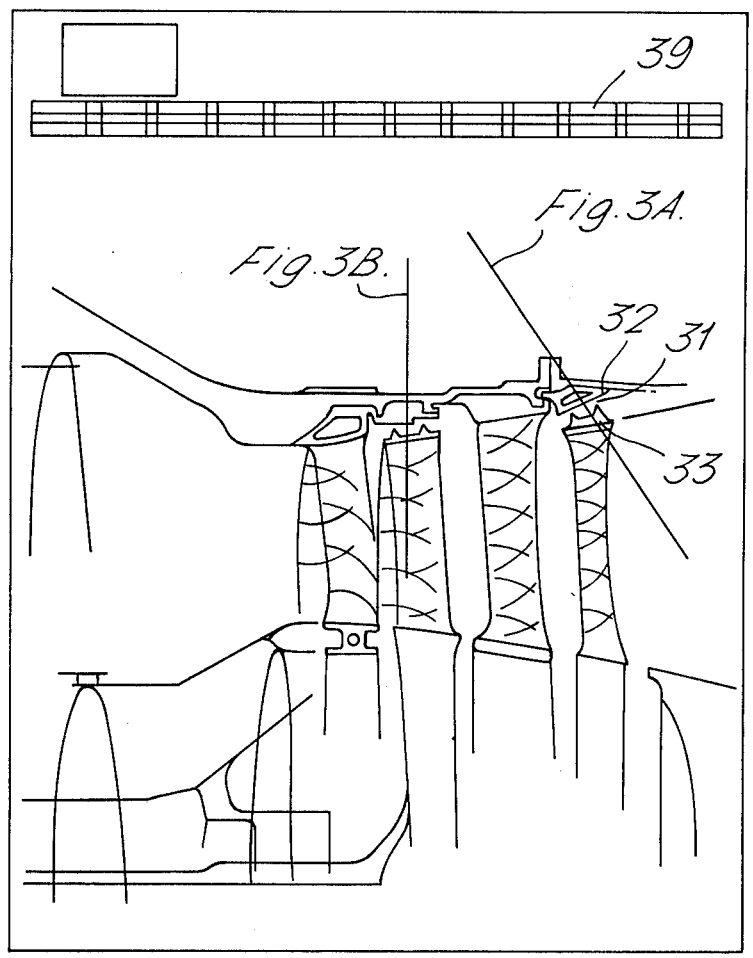
FIG. 2 shows a typical radiographic image.
Figure 3A:
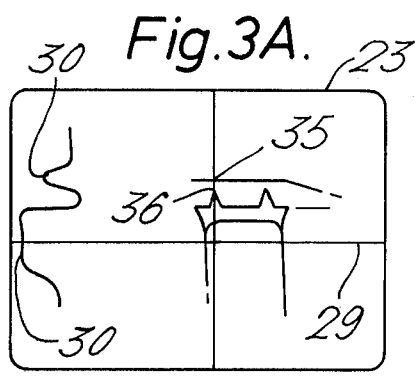
FIGS. 3A and 3B show the corresponding image on the output screen of a video microdensitometer.
Figure 3B:
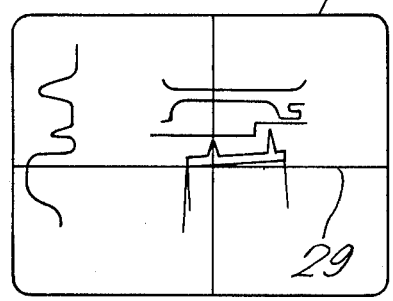

It is also possible to measure clearances that lie in directions other than those readily aligned with the X and Y axes as can be seen by the clearance 31 between the co-operating seal parts 32, 33 of FIG. 2. This clearance subtends an angle of 45° to the axial or, in this case, the X - direction. Two methods are available for measuring the clearance 31. In the first place the supporting structure for the radiographic film incorporates a rotary table 34 which may be used to rotate the radiographic film and align the clearance 31 with either the X or Y directions and secondly the interface between the video camera and the video microdensitometer may be adapted so as to invert the X and Y co-ordinates as seen on the output screen 23, as for example by rotating the camera.

In this way the X co-ordinates of the points 35, 36 may be found, the camera rotated, as by the switch 37, and then the Y co-ordinates of the points 35, 36 found.

Indulgence in a little mathematics will then yield the clearance between the points 35, 36 from their respective pairs of co-ordinates. The latter method whilst slightly more combersome than the former does have special advantages in certain circumstances. In measuring spatial relationships in gas turbine engines it is frequently desirable to take two radiographs at different engine conditions and then to compare the changes in spatial relationships. This comparison is made more informative if the axial and radial changes that contribute to the total clearance change can be separately identified (as by their X and Y co-ordinates). In this way axial growth due to perhaps both elastic and thermal considerations can be separated from radial growths due, perhaps, primarily to centrifugal and thermal considerations:

In order to assist with correct alignment of the radiographic film relative to the co-ordinate measuring framework and to give a base datum from which absolute measurements can be made it is useful to provide a heavy metal datum bar during the taking of the radiographs. Which will appear as an image 39 on the radiograph. This datum bar is useful to enable radiographers to have a standard by which relative intensity of successive radiographs can be judged. Furthermore, because the axial extent of the bar is similar to the length of the radiographic film it produces an image which indicates the extent to which geometrical considerations need to be weighted in relation to the divergence of the X-ray beam in order to asses the confidence with which limits can be applied to the spatial relationships measured from different parts of the radiographic image.

We have also found it helpful to place a coloured filter in front of the output screen of the videomicrodensitometer which is a long persistence screen in order to improve the subjective visual impression of the outer image.

Figure 4:
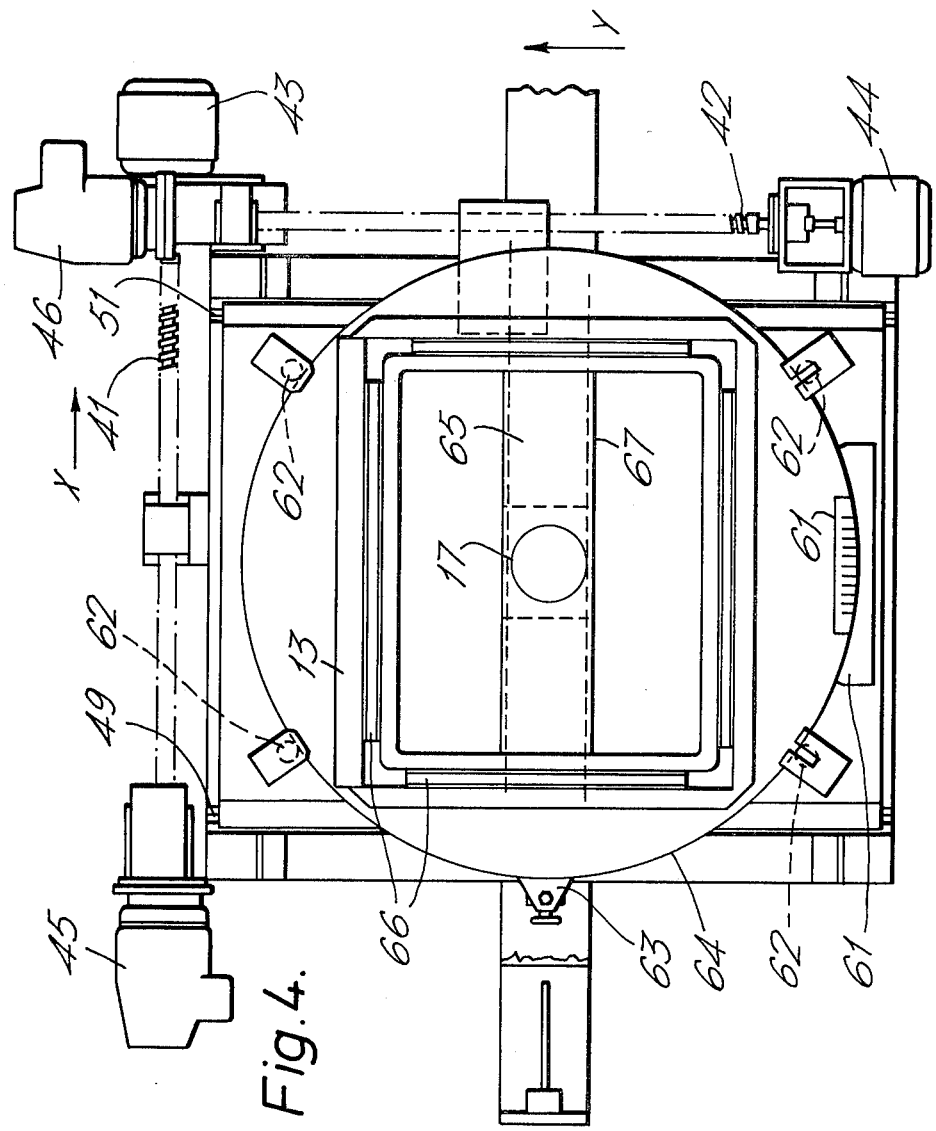
FIG. 4 is a plan view of the co-ordinate measuring framework of FIG. 1.

Turning now to FIGS. 4 and 5 the co-ordinate measuring framework and associated supporting structure is shown in more detail.

The supporting structure 15 is movable in the X and Y directions by two recirculating ball screws 41, 42 respectively these screws are each driven by fast traverse motors 43, 44 and by stepping motors 45, 46 which allow fine movement of the table in one thousandth of an inch increments.

Thus the stepping motors provide a fine adjustment whilst the fast traverse motors provide an initial coarse positioning of the supporting structure 15.

In order to separate the X and Y movements of the supporting structure it comprises two generally flat tables 47, 48 supported one to another on guides 49, 51 which incorporates rows of ball bearings 52, 53 and the lower table 48 is similarly supported by guides 54, 55 and ball bearings 56 onto a base 57 to which the co-cordinate measuring framework 16 is fixed.

The co-ordinate measuring framework is of the well known kind in which a band 58 co-operates with an electromagnetic pickup 59 to generate signals representative of the relative movement between the band and the pickup. These signals are subsequently on a screen and if desired accompanied by a digital printout and storage. There is a band and pickup also associated with movement of the table 48 in the X direction and these readings are included in the digital printout and storage facility.

On top of the table 47 is mounted the rotary table 34 which is calibrated with vernier scale 61 and which turns between four guide rollers 62 and can be locked in position by a clamp assembly 63 connected to the table 47 and operative on the periphery 64 of the table 34.

The rotary table 34 is provided with a rectangular aperture greater than the size of the radiograhpic plate as is the table 47 beneath the rotary table 34.

The table 48 beneath the table 47 is provided with a longitudinal slot 65 parallel to the X-direction in which the table 47 can move. In order to provide a background illumination of the radiograph there is provided a rectangular arrangement of fluorescent tubes 66 this enables an operator to initially position the radiograph to allow the desired features to be located under the video camera 19. The tubes provide illumination of the film by reflection from the top of the table 48.

An aluminium plate 67 is stretched across the longitudinal slot 65 in order to assist the fluorescent tubes in illuminating the radiograph.

It will be appreciated that other co-ordinating measuring frameworks may be substituted for the measuring system described above, in particular a Moire fringe system can be used if higher accuracies are desired.

It will be further appreciated that whilst in this embodiment the video camera was fixed relative to the co-ordinate measuring framework and the recorded image was movable relative to the co-ordinate measuring framework, that it would be equally possible to fix the recorded image to the framework and to move the video camera relative thereto.

Whilst the above description relates to measuring from radiographic images it will be understood that it may equally apply to measuring from other forms of recorded images, for example photographs.

I claim:

1. Apparatus capable of taking spatial measurements of the relative positions of features of a recorded image comprises a co-ordinate measuring framework, a video camera disposed to scan a selectable area of the recorded image, wherein the video camera and recorded image are mounted for relative movement therebetween on the co-ordinate measuring framework, there being provided means for passing output information from the video camera to a video-microdensitometer for displaying an amplified image of the selected area of said recorded image on an output screen of the video microdensitometer together with a plot representative of the optical density variation along a selected line through said amplified image, said video microdensitometer incorporating at least one datum mark against which the amplified image and corresponding portions of the said plot may be aligned by relative movement of the recorded image and video camera within the co-ordinate measuring framework whereby the relative spatial disposition of parts of the recorded image are determinable from said relative movements by means of the co-ordinate measuring framework.

2. Apparatus according to claim 1 and in which a light source for illuminating an area of said recorded image is mounted on the framework in optical alignment with the camera.

3. Apparatus according to claim 2 and in which the video camera and light source are fixedly mounted on the framework and the recorded image is movable relative thereto.

4. Apparatus according to claim 1 and in which the co-ordinate measuring framework comprises a pair of co-ordinate axes, means for supporting a recorded image on a first table movable relative to one co-ordinate axis said first table being supported on a second table moveable on a support relative to the other co-ordinate axis and illuminating means are disposed on the support beneath both tables and are capable of producing a uniformly illuminated area on the recorded image and wherein the tables are adapted to allow the transmission of light therethrough and movable so that any desired portion of the recorded image can be illuminated and whereby the extent of said movements may be determined from respective measuring means associated with each co-ordinate axis.

5. A method of taking spatial measurements of the relative positions of features of an image recorded on film comprises the steps of:
mounting the recorded image on a co-ordinate measuring framework,
mounting a video camera on the framework,
viewing a selected area of the recorded image with the video camera to provide an output image which is fed to a video-microdensitometer,
displaying said output image on an output screen of the video-microdensitometer together with a plot representative of the optical density variation along a selected line through the output image, said videomicrodensitometer incorporating at least one datum mark against which desired features of the display image and the corresponding portions of said plot may be aligned,
causing relative movement between the recorded image and the video camera withhin the co-ordinate measuring framework thereby producing a corresponding movement of the displayed image on said screen to produce said alignment,
whereby the relative spatial dispositions of the desired features of the recorded image are determinable from the relative movements of the recorded image and the video camera as shown by co-ordinate readings from the framework.

* * * * *